No. 646,133. Patented Mar. 27, 1900.
P. T. SIEVERT.
APPARATUS FOR MANUFACTURING HOLLOW GLASS ARTICLES.
(Application filed Jan. 3, 1900.)

(No Model.) 3 Sheets—Sheet 1.

Witnesses:-
Edward Pieser
George Barry Jr.

Inventor.
Paul Theodor Sievert
by attorneys
Brown & Seward

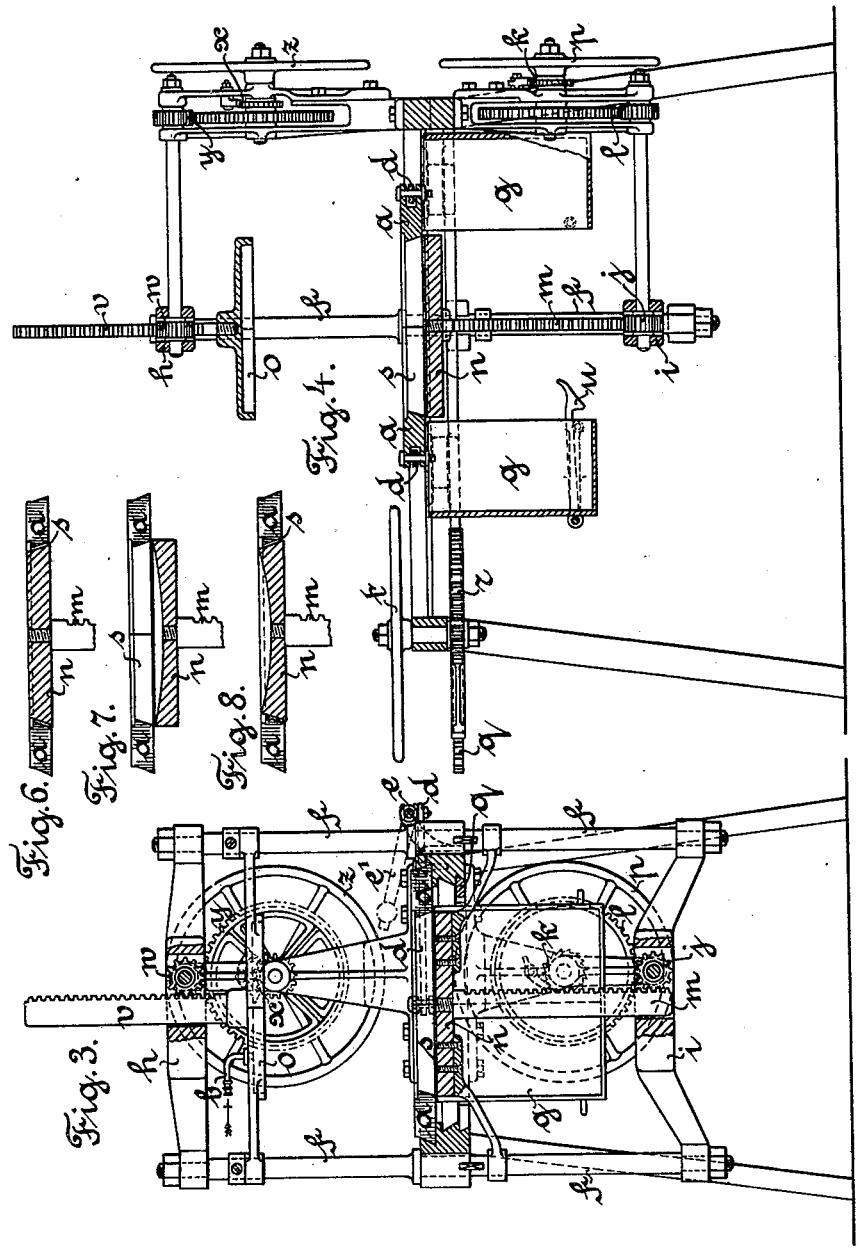

No. 646,133. Patented Mar. 27, 1900.
P. T. SIEVERT.
APPARATUS FOR MANUFACTURING HOLLOW GLASS ARTICLES.
(Application filed Jan. 3, 1900.)
(No Model.) 3 Sheets—Sheet 3.
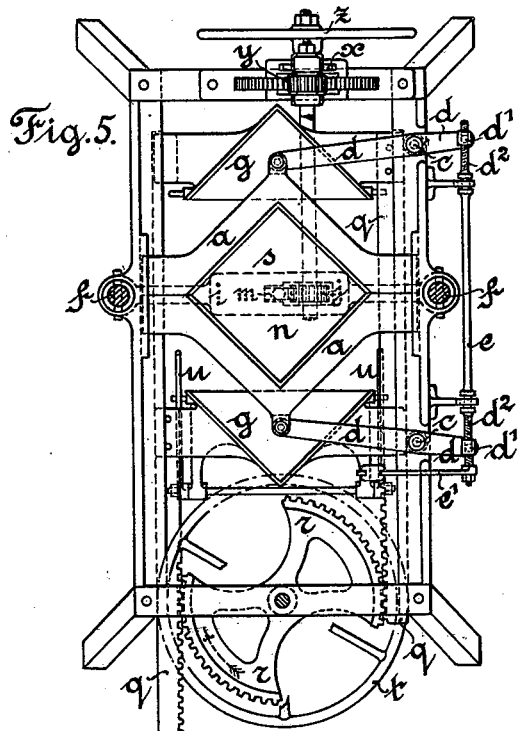
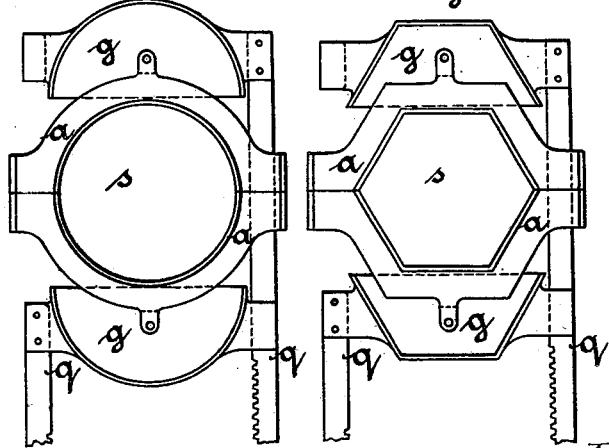

UNITED STATES PATENT OFFICE.

PAUL THEODOR SIEVERT, OF DRESDEN, GERMANY.

APPARATUS FOR MANUFACTURING HOLLOW GLASS ARTICLES.

SPECIFICATION forming part of Letters Patent No. 646,133, dated March 27, 1900.

Application filed January 3, 1900. Serial No. 206. (No model.)

*To all whom it may concern:*

Be it known that I, PAUL THEODOR SIEVERT, a subject of the King of Saxony, and a resident of Dresden, in the Kingdom of Saxony, in the German Empire, have invented a new and useful Improvement in Apparatus for Manufacturing Hollow Glass Articles, of which the following is a specification.

This invention relates to an apparatus for the production of hollow glass bodies.

I will first describe with reference to the accompanying drawings an apparatus embodying my invention and will afterward point out its novelty in claims.

Figure 1:
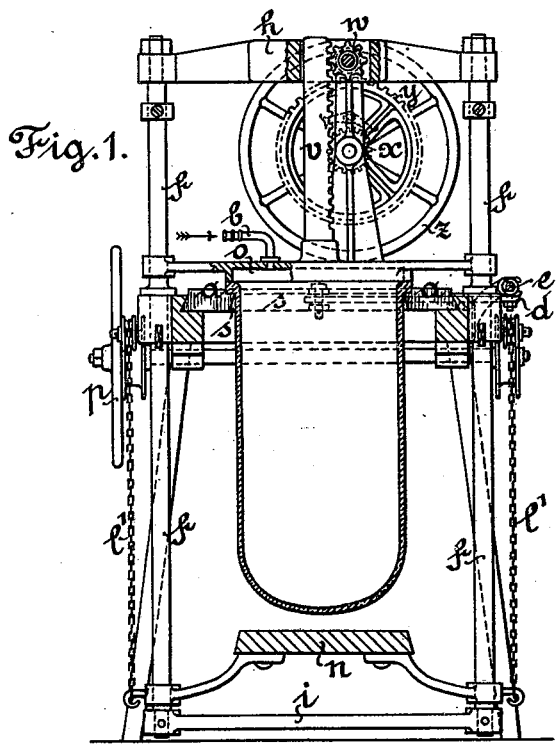
Figure 2:
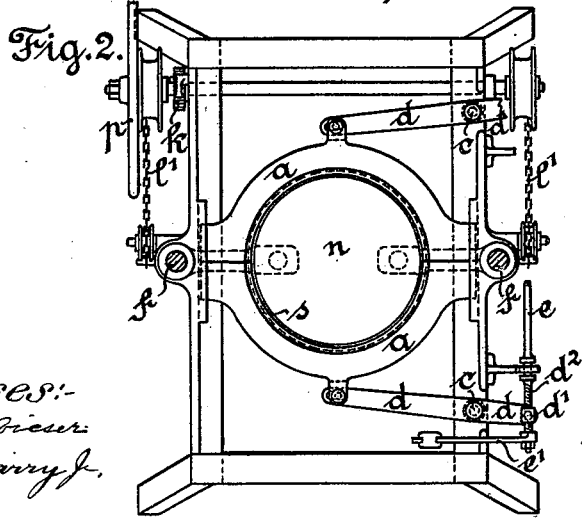

Figure 1 is an end view of the apparatus, partly in vertical section. Fig. 2 is a plan of the apparatus with some parts removed. Fig. 3 is an end view of the apparatus, partly in vertical section, with a divided mold. Fig. 4 is a side view of the apparatus, partly in vertical section, with the divided mold separated. Fig. 5 is a plan of the apparatus. Figs. 6, 7, and 8 show side views, partly in section, of several detail parts of the above figures; and Figs. 9 and 10 show plans of different molds for the apparatus shown in Figs. 3 and 4.

With reference to Figs. 1 and 2, between two pillars $ff$ and resting in suitable guides a ring-shaped plate $a$ is mounted, consisting of two equal pieces divided vertically. These two plate-pieces are connected to the levers $d$, which have their fulcrum at $c$ on a suitable part of the framing. The ends of these frames are provided with suitable nuts $d'$, through which screws $d^2$, with steep threads pass. These two screws are connected by a rod $e$. The one screw is provided with a lever $e'$, which if turned the one way will cause the levers $d$ to remove the two parts of the plate $a$ from each other, but if turned the other way will bring the two parts together, so as to form an opening $s$, into which a plate $n$ in its uppermost position fits. (Shown in the plan Fig. 2.) In this view, Fig. 2, the pillars $ff$ are shown in horizontal section, and all parts above the ring-shaped plate $a$ and the plate $n$ are removed. In Fig. 1 this plate $n$ is shown lowered down by means of its guides on the pillars $ff$ and by means of chains $l'$, which run over suitable rollers and may be worked by the hand-wheel $p$. If the plate $n$ is raised into the uppermost position, it will close the opening in the ring-shaped plate $a$, and it will be held in this position by the pawl and ratchet $k$. If the pawl and ratchet are disconnected, the plate $n$ may be lowered to any convenient distance. Above the plate $a$ a hollow box $o$, open toward the plate $a$, is arranged to be lowered and raised by means of the rack $v$, pinion $w$, spur-wheel $y$, and handwheel $z$, the uppermost position of said box being secured by pawl and ratchet $x$. The box $o$ in its movement is guided by its rack $v$ in the traverse $h$ and by its eyes surrounding the pillars $ff$. Into the box $o$ the pipe $b$ opens for admitting a pressure medium—gas, air, or steam—into said box, and the admittance may be regulated by any suitable valve or cock in pipe $b$. The lower rim of the box $o$ may be blunt or tapering, with which rim it rests on the layer of plastic glass.

Now in order to produce hollow glass bodies by the above-described apparatus, the box $o$ is raised into its uppermost position and the plate $n$ is also raised into its uppermost position, so that said plate $n$ fills out the opening $s$ in the ring-shaped plate $a$, the two parts of which are brought closely together. Thus the apparatus is ready to receive on the plates $a$ and $n$ a plastic layer of molten glass, which may be produced by pouring molten glass on $a$ and $n$ and spreading the glass out by a suitable implement or by preparing the plastic layer outside the apparatus and by removing it quickly upon the plates $a$ and $n$. Thereafter the box $o$ is quickly lowered, so that its lower rim rests upon the glass layer outside that circle which is formed by the plate $n$. Now the plate $n$ is lowered quickly, and in this instance the plastic layer of molten glass will commence to sink into and through the aperture $s$, caused by the removal of plate $n$. Now the blowing begins by opening a cock or valve in the pipe $b$. Thus the elastic-pressure medium is admitted, which forces the plastic glass down to form a hollow glass body. Of course the form of this body in its initial shape will depend upon the form of the opening $s$, caused by the removal of the plate $n$ out of the ring-shaped plate $a$. The blowing of the glass may be continued until the hollow glass body has obtained its desired form. For instance, in the example shown in Fig. 1 a glass cylinder has been formed. If the desired form is obtained, the admission of the elastic-pressure medium is stopped, the box $o$ is raised, and if now the glass of the body has become sufficiently solidified the cylinder is seized by hand or by suitable implement and after the separation of the two parts of the ring-shaped plate $a$ from each other is removed out of the apparatus.

The apparatus as illustrated in Figs. 3, 4, and 5 shows some modifications, the main one being that while in the apparatus illustrated by Figs. 1 and 2 the blowing of the glass took place in the open air molds are now provided for shaping the glass bodies. The plate $a$, its purpose, and means for shifting its parts are equal to that shown in Figs. 1 and 2. The box $o$, its purpose, and means for raising and lowering the same are equal to that shown in Figs. 1 and 2. The plate $n$ instead of being lowered and raised by chains is shown here to be raised or lowered by the rack $m$, pinions $j$, spur-wheels $l$, and hand-wheel $p$, while the uppermost position of plate $n$ is secured by the pawl and ratchet $k$. The mold $g$ is made in two parts. Each part slides in suitable guides and is provided with a rack $q$, which racks are simultaneously worked by the toothed segments $r$ $r$, on the pivot of which the hand-wheel $t$ is mounted. By turning this wheel the parts $g$ $g$ of the mold are either closed or separated.

The working of the apparatus in order to produce hollow glass bodies is the same as that described with reference to Figs. 1 and 2, with this modification, that if the plate $n$ is lowered to its lowest position the mold parts $g$ are moved to form a closed mold for the expansion of the glass blown into it to form the desired body. The one part of mold $g$ is preferably provided with a hinged hook $u$ and the other part with a knob to catch said hook and to cause a perfect closure of the complete mold. After the formation of the hollow body the parts of the mold $g$ are again separated, the box $o$ is raised, and the parts of the plate $a$ are separated in order to allow the hollow glass body to be removed out of the apparatus.

In order to illustrate that ring-shaped plates $a$ and molds $g$ of different shape may be used, Fig. 5 shows a square plate $a$ and square mold $g$. Fig. 9 shows a round plate $a$ and round mold $g$. Fig. 10 shows a hexagonal plate $a$ and hexagonal mold $g$. This illustrates that plates and molds of all suitable shapes may be employed.

The layer of plastic glass may either be spread out or brought upon the ring-shaped plate $a$ and plate $n$ as described with reference to Figs. 1 and 2 and as illustrated in detached views in Figs. 6 and 8, in which the plate $n$ fits snugly in the opening $s$ of plate $a$; but the layer of plastic glass may also be deposited within the opening $s$ of the plate $a$, in which case the plate $n$ forms the bottom of said opening, as illustrated in the sectional views, Figs. 3, 4, and 7. The surface of plate $n$ may be of any suitable shape—for instance, it may form a cavity, as indicated in Figs. 7 and 8. In this case the layer of plastic glass is of greater depth in the middle than at the sides, which may be useful in the production of some hollow glass bodies.

I claim—

1. An apparatus for producing hollow glass bodies out of a layer of plastic glass by means of an elastic-pressure medium, consisting in a plate $a$ with an aperture $s$, a plate $n$ for closing said aperture, a box $o$ for covering the layer of plastic glass on said plates and for receiving the elastic-pressure medium, and means for removing said plate $n$ and box $o$ from the aperture in said plate $a$.

2. An apparatus for producing hollow glass bodies out of a layer of plastic glass, by means of an elastic-pressure medium, consisting in a divided plate $a$ with an aperture $s$ and means for moving the parts of said plate $a$, a box $o$ open at one side, provided with an inlet for the elastic-pressure medium and means for lowering and raising said box $o$, a plate $n$ for closing the aperture $s$ in plate $a$ and means for lowering and raising said plate $n$.

3. An apparatus for producing hollow glass bodies out of a layer of plastic glass by means of an elastic-pressure medium, consisting in a plate $a$, provided with an aperture, a closing-plate $n$ for said aperture, a box $o$ and a divided form or mold $g$ and means for moving the parts of mold $g$, the plate $n$ and the box $o$.

In testimony that I claim the foregoing as my invention I have signed my name, in presence of two witnesses, this 15th day of December, 1899.

PAUL THEODOR SIEVERT.

Witnesses:
WILHELM WIESENHÜTTEN,
WENZEL ZENKER.